United States Patent [19]

Lacome et al.

[11] Patent Number: 6,054,418
[45] Date of Patent: Apr. 25, 2000

[54] PROCESS FOR SULFURIZING UNSATURATED FATTY SUBSTANCES BY ELEMENTARY SULFUR IN THE PRESENCE OF AMINO COMPOUNDS

[75] Inventors: Thierry Lacome, Rueil Malmaison; Bruno Delfort, Paris; Maurice Born, Nanterre, all of France

[73] Assignee: Institut Francais du Petrole, France

[21] Appl. No.: 08/819,710

[22] Filed: Mar. 18, 1997

[30] Foreign Application Priority Data

Mar. 19, 1996 [FR] France .................................. 96 03493

[51] Int. Cl.⁷ .............................................. C10M 135/06
[52] U.S. Cl. ............................ 508/344; 508/345; 568/72
[58] Field of Search ................................ 568/59, 61, 69, 568/70, 72; 508/343, 344, 345; C10M 135/06

[56] References Cited

U.S. PATENT DOCUMENTS

| | | | |
|---|---|---|---|
| 2,644,810 | 7/1953 | Beretvas | 568/59 |
| 3,740,333 | 6/1973 | Hutchinson | 508/345 |
| 3,926,822 | 12/1975 | Habiby | 508/343 |
| 3,986,966 | 10/1976 | Wakim | 508/345 |
| 4,119,549 | 10/1978 | Davis | 508/324 |
| 4,584,113 | 4/1986 | Walsh | 508/343 |
| 4,959,168 | 9/1990 | Scroeck | 508/343 |
| 5,338,468 | 8/1994 | Arvizzigno et al. | 508/343 |

FOREIGN PATENT DOCUMENTS

| | | |
|---|---|---|
| 0 258 168 | 3/1988 | European Pat. Off. . |
| 2167527 | 8/1973 | France . |
| 588353 | 5/1947 | United Kingdom . |
| 630889 | 10/1949 | United Kingdom . |

*Primary Examiner*—Jacqueline V. Howard
*Assistant Examiner*—Cephia D. Toomer
*Attorney, Agent, or Firm*—Millen, White, Zelano & Branigan, P.C.

[57] ABSTRACT

A process for sulfurizing a composition of unsaturated fatty ester is described in which said composition is reacted with elemental sulfur in the presence of a promoter that consists of at least one compound with an amine group and in the presence of water. When the sulfur-containing product is separated from an aqueous phase that contains the compound with an amine group, the latter can be reused for several successive sulfurations without substantial loss of activity of the promoter. The compositions of unsaturated fatty esters can be used as additives for lubricating oils or fats.

6 Claims, No Drawings

PROCESS FOR SULFURIZING UNSATURATED FATTY SUBSTANCES BY ELEMENTARY SULFUR IN THE PRESENCE OF AMINO COMPOUNDS

BACKGROUND OF THE INVENTION

The invention relates to a new process for obtaining sulfur-containing products from compositions of mono- or poly-unsaturated monocarboxylic acid esters and monoalcohols or polyols and their sulfur-containing products that are thus obtained.

Unsaturated esters are defined more particularly as being formed between at least one monocarboxylic acid with an aliphatic chain of 3 to 30 carbon atoms that comprises at least one ethylenic unsaturation and at least one hydroxylated compound that is selected from among monoalcohols and polyols.

French application No. 2,727,426 describes a process for sulfurizing monoethylenic or polyethylenic hydrocarbons with 2 to 36 carbon atoms and 1 to 3 ethylenic unsaturations by reaction with elemental sulfur in the presence of an alkanolamine, morpholine or one of its derivatives, in the presence or absence of water.

French application No. 2,734,566 describes the same reaction that was carried out in the presence of guanidine carbonate and in the presence of water.

It has now been discovered that it was possible to sulfurize compositions of unsaturated esters, as defined above, effectively and advantageously by reaction with elemental sulfur in the presence of compounds with amine groups and water.

The process of the invention can be characterized more particularly by the fact that it comprises the reaction of a composition that comprises at least one unsaturated ester that is formed between at least one monocarboxylic acid with an aliphatic chain of 12 to 22 carbon atoms and that comprises at least one ethylenic unsaturation and at least one hydroxylated compound that is selected from among the aliphatic monoalcohols that contain, for example, 1 to 12 carbon atoms and the aliphatic polyols that contain, for example, 2 to 6 carbon atoms, with elemental sulfur, in the presence of a water soluble compound with an amine group, and in the presence of water.

As unsaturated esters that are used as starting products for the production process according to the invention, it is possible to cite more particularly the mixtures of esters of glycerol that constitute natural fatty substances, or animal or vegetable oils or fats. The fatty substances in question comprise mono-, di- and/or tri-glycerides, i.e., esters of glycerol in which the latter has one, two or three hydroxylated group(s) that are esterified by at least one aliphatic monocarboxylic acid (fatty acid), of which at least a portion is ethylenically mono- or poly-unsaturated.

The mixtures of esters that are obtained by transesterification of natural oils or fats with at least one aliphatic monoalcohol that has, for example, 1 to 12 carbon atoms, are also considered. The reason is that, in the natural oils or fats in question, at least a portion of aliphatic chains that correspond to the fatty acids comprises at least one ethylenic nonsaturation, and at least a portion of the esters of the mixture that is obtained by transesterification will consist of unsaturated esters.

Esters that are synthesized by esterification between at least one monocarboxylic acid with an ethylenically unsaturated (mono- or poly-unsaturated) aliphatic chain and at least one aliphatic monoalcohol or polyol hydroxylated compound, as defined above, can also be considered in the invention.

Esters that are synthesized by transesterification between at least one ester of a monocarboxylic acid having an ethylenically unsaturated aliphatic chain and an aliphatic monoalcohol or aliphatic polyol, and at least one different monoalcohol or polyol, will also be considered.

The water-soluble compounds with water-soluble amine groups that are used in the sulfurizing process of the invention can comprise at least one primary or secondary amine group; they can also comprise another group, for example an imine, alcohol, or ether group; they can also consist of cyclic compounds.

Among the compounds with amine groups in question, it is possible to cite more particularly:
- alkanolamines, such as, for example, mono-, di- and trimethanolamines and mono-, di- and triethanolamines;
- morpholine and its derivatives;
- piperidine;
- piperazine; and
- guanidine carbonate.

In the reaction for preparation of the sulfur-containing products of the invention, a proportion of elemental sulfur of up to about 200 g (or about 6 moles) by ethylenic unsaturation in the initial composition of unsaturated fatty ester is used.

The proportion of compound with an amine group can vary within wide limits. In particular, it can be from 0.1 to 4 moles per mole of sulfur used. It is noted, surprisingly enough, that the compound with an amine group can be used particularly at a very small proportion and that it is not present in the sulfur-containing product that is ultimately obtained. It is also conceivable that it acts essentially as a promoter of sulfurization.

The proportion of water that is used in the reaction medium can vary widely and may be up to, for example, 20 mol by ethylenic nonsaturation of the starting fatty ester composition.

In general, the reaction is carried out at a temperature of 50 to 200° C. and most often of 90 to 160° C.

The pressure, which depends primarily on the vapor pressure of water and the amino compound at the reaction temperature, can range from atmospheric pressure up to, for example, 20 bars.

A particularly significant advantage of the sulfurizing process of the invention is that at the end of the reaction, the aqueous phase containing the compound with an amine group can be reused, after the desired sulfur-containing product is separated, to promote a subsequent preparation by simple addition of the reagents: fatty substances and sulfur. It thus is possible, by using the same promoter (water+ compound with an amine group), to carry out several e.g. at least 3, successive preparations of sulfur-containing product with the same effectiveness (without loss of activity of the promoter). This possibility is particularly advantageous when the compound with an amine group is expensive and/or when its evacuation poses problems associated with environmental protection.

The products of the invention are liquids that generally contain 1 to 30%, most often 5 to 25%, by mass of sulfur; the most common sulfur contents are 8 to 12% by mass. These products are clear and homogeneous, even at the highest sulfur contents. Their coloring varies according to the nature of the initial unsaturated fatty ester and the set amount of sulfur. They may range from having little or very little color (this is the case, for example, for the fatty substances with mainly monoethylenic unsaturation) to having a great deal of color (in the case of, for example, fatty substances with mainly polyethylenic unsaturation).

Furthermore, the sulfur-containing products of the invention are soluble in lubricating oils, particularly in mineral oils and synthetic oils. Further, they are virtually free of nitrogen.

The sulfur contents of the products of the invention impart to them anti-wear, extreme-pressure, and anti-oxidizing properties such that they can be used advantageously as additives in lubricating oils and fats, particularly in the formulation of oils for automobile gears, industrial oils, and machining oils or oils for metal-working. For these uses, the products of the invention are generally incorporated into lubricating compositions at concentrations of 0.05 to 20%, preferably of 0.5 to 10% by mass.

In the prior art, the preparation of imitations and sulfur-containing oils by reaction of elemental sulfur on unsaturated fatty substances in the presence of a promoter that consists of an aliphatic or alicyclic secondary amine, but in the absence of water, is described in patent GB-A-588 353. In particular, diethanolamine is used in the production of sulfur-containing oils that can be used as components of extreme-pressure lubricants or cutting oils. In the process described, the amine that is used, which has reacted with elemental sulfur to form the sulfurizing promoter, remains in the product that is obtained; this leads particularly to problems of toxicity for users.

The advantages of the invention compared to this prior process consist mainly in obtaining sulfur-containing products that are virtually free of nitrogen, with the amine or sulfur-containing amine derivative remaining in the aqueous medium and not in the desired sulfur-containing fatty substance.

Further, the aqueous phase that contains the promoter is generally separated and can be reused in at least one new subsequent preparation.

The following examples illustrate the invention.

EXAMPLES

Example 1

Into a reactor that makes it possible to operate under pressure, 50 g of a mixture of fatty acid esters with an iodine number that is equal to 110 g of iodine per 100 g of product, 7.25 g (0.0833 mol) of morpholine, 6.0 g (0.187 mol) of sulfur, and 45 g of water are introduced. The medium is brought to a temperature of 130° C. and is kept at this temperature for 6 hours while being stirred. After returning to ambient temperature, the medium is diluted with 50 ml of n-heptane, and then the aqueous phase and the organic phase are separated by decantation. The aqueous phase is preserved to be used during the reaction that is described in Example 2. After the organic phase is dried on sodium sulfate and then filtered, evaporation under reduced pressure of n-heptane is initiated, and 55.6 g of a liquid product that is clear and soluble in mineral and synthetic oils is obtained whose sulfur content is 10.7% by mass and whose nitrogen content is less than 0.1% by mass.

Example 1A (Comparative)

Example 1 is repeated without using water. Thus, into a reactor that makes it possible to operate under pressure, 50 g of a mixture of fatty acid esters with an iodine number that is equal to 110 g of iodine per 100 g of product, 7.25 g (0.0833 mol) of morpholine, and 6.0 g (0.187 mol) of sulfur are introduced. The medium is brought to a temperature of 130° C. and is kept at this temperature for 6 hours while being stirred. After returning to ambient temperature, the medium is diluted with 50 ml of n-heptane. After filtration, evaporation under reduced pressure of n-heptane is initiated, and 61 g of a liquid product that is soluble in mineral oils, whose sulfur content is 9.4% by mass and whose nitrogen content is 1.8% by mass, is obtained.

Example 2

Into a reactor that makes it possible to operate under pressure, 50 g of a mixture of fatty acid esters with an iodine number equal to 110 g of iodine per 100 g of product (identical to that used during the reaction described in Example 1), the entire aqueous phase that is separated during Example 1, and 6.0 g (0.187 mol) of sulfur are introduced. The medium is brought to a temperature of 130° C. and is kept at this temperature for 6 hours while being stirred. After returning to ambient temperature, the medium is diluted with 50 ml of n-heptane, and then the aqueous phase and the organic phase are separated by decantation. The aqueous phase is preserved to be used during the reaction that is described in Example 3. After the organic phase is dried on sodium sulfate and then filtered, evaporation under reduced pressure of n-heptane is initiated, and 55.2 g of a liquid product that is clear and soluble in mineral and synthetic oils is obtained, whose sulfur content is 10.6% by mass and whose nitrogen content is less than 0.1% by mass.

Example 3

Into a reactor that makes it possible to operate under pressure, 50 g of a mixture of fatty acid esters with an iodine number equal to 110 g of iodine per 100 g of product (identical to that used during the reaction described in the preceding examples), the entire aqueous phase that is separated during Example 2, and 6.0 g (0.187 mol) of sulfur are introduced. The medium is brought to a temperature of 130° C. and is kept at this temperature for 6 hours while being stirred. After returning to ambient temperature, the medium is diluted with 50 ml of n-heptane, and then the aqueous phase and the organic phase are separated by decantation. The aqueous phase is preserved to be used during the reaction that is described in Example 4. After the organic phase is dried on sodium sulfate and then filtered, evaporation under reduced pressure of n-heptane is initiated, and 55.3 g of a liquid product that is clear and soluble in mineral and synthetic oils is obtained, whose sulfur content is 10.8% by mass and whose nitrogen content is less than 0.1% by mass.

Example 4

Into a reactor that makes it possible to operate under pressure, 50 g of a mixture of fatty acid esters with an iodine number equal to 110 g of iodine per 100 g of product (identical to that used during the reaction described in the preceding examples), the entire aqueous phase that is separated during Example 3, and 6.0 g (0.187 mol) of sulfur are introduced. The medium is brought to a temperature of 130° C. and is kept at this temperature for 6 hours while being stirred. After returning to ambient temperature, the medium is diluted with 50 ml of n-heptane, and then the aqueous phase and the organic phase are separated by decantation. The aqueous phase is preserved to be used during subsequent reactions. After the organic phase is dried on sodium sulfate and then filtered, evaporation under reduced pressure of n-heptane is initiated, and 53.8 g of a liquid product that is clear and soluble in mineral and synthetic oils is obtained, whose sulfur content is 11.0% by mass and whose nitrogen content is less than 0.1% by mass.

Example 5

Into a reactor that makes it possible to operate under pressure, 50 g of a mixture of fatty acid esters with an iodine number equal to 110 g of iodine per 100 g of product (identical to that used during the reaction described in Example 1), 5.1 g (0.083 mol) of ethanolamine, 6.0 g (0.187 mol) of sulfur, and 45 g of water are introduced. The medium is brought to a temperature of 130° C. and is kept at this temperature for 6 hours while being stirred. After returning to ambient temperature, the medium is diluted with 50 ml of n-heptane, and then the aqueous phase and the organic phase are separated by decantation. The aqueous phase is preserved to be used during the reaction that is described in Example 6. After the organic phase is dried on sodium sulfate and then filtered, evaporation under reduced pressure of n-heptane is initiated, and 54.5 g of a liquid product that is clear and soluble in mineral and synthetic oils is obtained, whose sulfur content is 11.0% by mass and whose nitrogen content is less than 0.1% by mass.

Example 6

Into a reactor that makes it possible to operate under pressure, 50 g of a mixture of fatty acid esters with an iodine number equal to 110 g of iodine per 100 g of product (identical to that used during the reaction described in Example 1), the entire aqueous phase that is separated during Example 5, and 6.0 g (0.187 mole) of sulfur are introduced. The medium is brought to a temperature of 130° C. and is kept at this temperature for 6 hours while being stirred. After returning to ambient temperature, the medium is diluted with 50 ml of n-heptane, and then the aqueous phase and the organic phase are separated by decantation. The aqueous phase is preserved to be used during the reaction that is described in Example 7. After the organic phase is dried on sodium sulfate and then filtered, evaporation under reduced pressure of n-heptane is initiated, and 54.0 g of a liquid product that is clear and soluble in mineral and synthetic oils is obtained, whose sulfur content is 11.5% by mass and whose nitrogen content is less than 0.1% by mass.

Example 7

Into a reactor that makes it possible to operate under pressure, 50 g of a mixture of fatty acid esters with an iodine number equal to 110 g of iodine per 100 g of product (identical to that used during the reaction described in the preceding examples), the entire aqueous phase that is separated during Example 6, and 6.0 g (0.187 mole) of sulfur are introduced. The medium is brought to a temperature of 130° C. and is kept at this temperature for 6 hours while being stirred. After returning to ambient temperature, the medium is diluted with 50 ml of n-heptane, and then the aqueous phase and the organic phase are separated by decantation. The aqueous phase is preserved to be used during subsequent reactions. After the organic phase is dried on sodium sulfate and then filtered, evaporation under reduced pressure of n-heptane is initiated, and 53.0 g of a liquid product that is clear and soluble in mineral and synthetic oils is obtained, whose sulfur content is 11.0% by mass and whose nitrogen content is less than 0.1% by mass.

Example 8

Into a reactor that makes it possible to operate under pressure, 50 g of a mixture of fatty acid esters with an iodine number equal to 110 g of iodine per 100 g of product (identical to that used during the reaction described in the preceding examples), the entire aqueous phase that is separated during Example 7, and 6.0 g (0.187 mole) of sulfur are introduced. The medium is brought to a temperature of 130° C. and is kept at this temperature for 6 hours while being stirred. After returning to ambient temperature, the medium is diluted with 50 ml of n-heptane, and then the aqueous phase and the organic phase are separated by decantation. The aqueous phase is preserved to be used during subsequent reactions. After the organic phase is dried on sodium sulfate and then filtered, evaporation under reduced pressure of n-heptane is initiated, and 54.2 g of a liquid product that is clear and soluble in mineral and synthetic oils is obtained, whose sulfur content is 11.4% by mass and whose nitrogen content is less than 0.1% by mass.

Example 9

Into a reactor that makes it possible to operate under pressure, 50 g of a mixture of fatty acid esters with an iodine number equal to 110 g of iodine per 100 g of product (identical to that used during the reaction described in Example 1), 5.0 g (0.027 mol) of guanidine carbonate, 6.0 g (0.187 mole) of sulfur, and 45 g of water are introduced. The medium is brought to a temperature of 130° C. and is kept at this temperature for 6 hours while being stirred. After returning to ambient temperature, the medium is diluted with 50 ml of n-heptane, and then the aqueous phase and the organic phase are separated by decantation. The aqueous phase is preserved to be used during the reaction that is described in Example 10. After the organic phase is dried on sodium sulfate and then filtered, evaporation under reduced pressure of n-heptane is initiated, and 52.0 g of a liquid product that is clear and soluble in mineral and synthetic oils is obtained, whose sulfur content is 10.9% by mass and whose nitrogen content is less than 0.1% by mass.

Example 10

Into a reactor that makes it possible to operate under pressure, 50 g of a mixture of fatty acid esters with an iodine number equal to 110 g of iodine per 100 g of product (identical to that used during the reaction described in Example 1), the entire aqueous phase that is separated during Example 9, and 6.0 g (0.187 mole) of sulfur are introduced. The medium is brought to a temperature of 130° C. and is kept at this temperature for 6 hours while being stirred. After returning to ambient temperature, the medium is diluted with 50 ml of n-heptane, and then the aqueous phase and the organic phase are separated by decantation. The aqueous phase is preserved to be used during the reaction that is described in Example 11. After the organic phase is dried on sodium sulfate and then filtered, evaporation under reduced pressure of n-heptane is initiated, and 54.0 g of a liquid product that is clear and soluble in mineral and synthetic oils is obtained, whose sulfur content is 11.5% by mass and whose nitrogen content is less than 0.1% by mass.

Example 11

Into a reactor that makes it possible to operate under pressure, 50 g of a mixture of fatty acid esters with an iodine number equal to 110 g of iodine per 100 g of product (identical to that used during the reaction described in the preceding examples), the entire aqueous phase that is separated during Example 10, and 6.0 g (0.187 mole) of sulfur are introduced. The medium is brought to a temperature of 130° C. and is kept at this temperature for 6 hours while being stirred. After returning to ambient temperature, the medium is diluted with 50 ml of n-heptane, and then the aqueous phase and the organic phase are separated by decantation. The aqueous phase is preserved to be used during subsequent reactions. After the organic phase is dried on sodium sulfate and then filtered, evaporation under reduced pressure of n-heptane is initiated, and 53.0 g of a liquid product that is clear and soluble in mineral and synthetic oils is obtained, whose sulfur content is 11.1% by mass and whose nitrogen content is less than 0.1% by mass.

Example 12

Into a reactor that makes it possible to operate under pressure, 50 g of a mixture of fatty acid esters with an iodine number that is equal to 110 g of iodine per 100 g of product (identical to that used during the reaction described in Example 1), 7.1 g (0.083 mol) of piperidine, 6.0 g (0.187 mol) of sulfur, and 45 g of water are introduced. The medium is brought to a temperature of 130° C. and is kept at this temperature for 6 hours while being stirred. After returning to ambient temperature, the medium is diluted with 50 ml of n-heptane, and then the aqueous phase and the organic phase are separated by decantation. The aqueous phase is preserved to be used during the reaction that is described in Example 13. After the organic phase is dried on sodium sulfate and then filtered, evaporation under reduced pressure of n-heptane is initiated, and 53.5 g of a liquid product that is clear and soluble in mineral and synthetic oils is obtained whose sulfur content is 8.9% by mass and whose nitrogen content is less than 0.1% by mass.

Example 13

Into a reactor that makes it possible to operate under pressure, 50 g of a mixture of fatty acid esters with an iodine number equal to 110 g of iodine per 100 g of product (identical to that used during the reaction described in the preceding examples), the entire aqueous phase that is separated during Example 12, and 6.0 g (0.187 mole) of sulfur are introduced. The medium is brought to a temperature of 130° C. and is kept at this temperature for 6 hours while being stirred. After returning to ambient temperature, the medium is diluted with 50 ml of n-heptane, and then the aqueous phase and the organic phase are separated by decantation. The aqueous phase is preserved to be used during subsequent reactions. After the organic phase is dried on sodium sulfate and then filtered, evaporation under reduced pressure of n-heptane is initiated, and 53.0 g of a liquid product that is clear and soluble in mineral and synthetic oils is obtained, whose sulfur content is 8.9% by mass and whose nitrogen content is less than 0.1% by mass.

Example 14

Into a reactor that makes it possible to operate under pressure, 50 g of a mixture of fatty acid esters with an iodine number that is equal to 110 g of iodine per 100 g of product (identical to that used during the reaction that is described in Example 1), 5.18 g (0.054 mol) of piperazine, 6.0 g (0.187 mol) of sulfur, and 45 g of water are introduced. The medium is brought to a temperature of 130° C. and is kept at this temperature for 6 hours while being stirred. After returning to ambient temperature, the medium is diluted with 50 ml of n-heptane, and then the aqueous phase and the organic phase are separated by decantation. The aqueous phase is preserved to be used during subsequent reactions. After the organic phase is dried on sodium sulfate and then filtered, evaporation under reduced pressure of n-heptane is initiated, and 53.9 g of a liquid product that is clear and soluble in mineral and synthetic oils is obtained whose sulfur content is 8.9% by mass and whose nitrogen content is less than 0.1% by mass.

Example 15

Into a reactor that makes it possible to operate under pressure, 50 g of a mixture of fatty acid esters with an iodine number equal to 110 g of iodine per 100 g of product (identical to that used during the reaction described in the preceding examples), the entire aqueous phase that is separated during Example 13, and 6.0 g (0.187 mole) of sulfur are introduced. The medium is brought to a temperature of 130° C. and is kept at this temperature for 6 hours while being stirred. After returning to ambient temperature, the medium is diluted with 50 ml of n-heptane, and then the aqueous phase and the organic phase are separated by decantation. The aqueous phase is preserved to be used during subsequent reactions. After the organic phase is dried on sodium sulfate and then filtered, evaporation under reduced pressure of n-heptane is initiated, and 52.7 g of a liquid product that is clear and soluble in mineral and synthetic oils is obtained, whose sulfur content is 8.8% by mass and whose nitrogen content is less than 0.1% by mass.

What is claimed is:

1. A process for sulfurizing a composition consisting essentially of a mixture of fatty acid esters of glycerol in which the glycerol has one, two or three hydroxylated group(s) that are esterified by at least one monocarboxylic acid having an aliphatic chain of 3 to 30 carbon atoms and at least one ethylenic unsaturation, said process comprising:

reacting said composition with elemental sulfur in the presence of a water-soluble compound with an amine group, in the presence of water.

2. A process according to claim 1, wherein said compound with an amine group is an alkanol amine, a morpholine compound, piperidine, piperazine, or guanidine carbonate.

3. A process according to claim 1, wherein said composition results from the transesterification of a natural oil or fat with at least one aliphatic monoalcohol having 1 to 12 carbon atoms.

4. A process according to claim 1, wherein the reaction is conducted at a pressure of atmospheric to 20 bar.

5. A process according to claim 1, wherein the reaction is conducted at atmospheric pressure.

6. A process according to claim 1, wherein at the end of the reaction, the sulfur-containing composition that is obtained and an aqueous phase that contains at least the majority of the compound with an amine group that is used are separated.

* * * * *